(12) United States Patent
Daniel et al.

(10) Patent No.: US 9,137,880 B2
(45) Date of Patent: Sep. 15, 2015

(54) GENERATION FROM PHASE CUT DIMMER OUTPUT WITH FAST RESPONSE TO CHANGES IN DIMMER POSITION

(75) Inventors: Bobby Jacob Daniel, Eindhoven (NL); Hinderikus Maria Wilhelmus Langeslag, Wijchen (NL)

(73) Assignee: NXP B.V., Eindhoven (NL)

( * ) Notice: Subject to any disclaimer, the term of this patent is extended or adjusted under 35 U.S.C. 154(b) by 1014 days.

(21) Appl. No.: 13/267,819

(22) Filed: Oct. 6, 2011

(65) Prior Publication Data
US 2012/0086354 A1    Apr. 12, 2012

(30) Foreign Application Priority Data

Oct. 7, 2010  (EP) ..................... 10186908

(51) Int. Cl.
  *H05B 37/02* (2006.01)
  *H05B 39/08* (2006.01)
  *H05B 33/08* (2006.01)

(52) U.S. Cl.
  CPC ............ *H05B 39/08* (2013.01); *H05B 33/0815* (2013.01); *H05B 33/0863* (2013.01); *Y02B 20/346* (2013.01)

(58) Field of Classification Search
  CPC ........... H05B 33/0815; H05B 33/0863; H05B 39/08; H05B 37/02; Y02B 20/346
  USPC ...... 315/209 R, 224–225, 291, 307, 287, 250
  See application file for complete search history.

(56) References Cited

U.S. PATENT DOCUMENTS

| 7,667,408 B2 * | 2/2010 | Melanson et al. ........ 315/209 R |
| 2009/0243582 A1 * | 10/2009 | Irissou et al. ................. 323/320 |
| 2010/0090618 A1 * | 4/2010 | Veltman ........................ 315/307 |
| 2011/0084622 A1 * | 4/2011 | Barrow et al. ................ 315/250 |

FOREIGN PATENT DOCUMENTS

| CN | 101 646 289 A | 2/2010 |
| WO | 2008/112735 A2 | 9/2008 |
| WO | 2009/094328 A2 | 7/2009 |
| WO | 2009/094329 A1 | 7/2009 |
| WO | 2009/120555 A1 | 10/2009 |

OTHER PUBLICATIONS

Extended European Search Report for Patent Appln. No. 10186908.9 (May 11, 2011).

* cited by examiner

*Primary Examiner* — Minh D A
*Assistant Examiner* — Amy Yang (57) ABSTRACT

A circuit for a dimmer system is disclosed, in which a phase-cut dimmer output signal is converted to a dimming control level signal. The phase-cut dimmer output signal is used to generated a pulse modulated signal indicative of the duty cycle of the phase cut dimmer output signal, and the pulse modulated signal is directly converted to a piece-wise linear dimming control level signal. By directly converting the pulse modulated signal to a piece-wise linear dimming control level signal, no further processing is necessary to produce a dimming signal which closely resembles the ideal logarithmic response of the human eye.

A corresponding method for a dimmer system is also disclosed, as is a dimmer system.

13 Claims, 5 Drawing Sheets

GENERATION FROM PHASE CUT DIMMER OUTPUT WITH FAST RESPONSE TO CHANGES IN DIMMER POSITION

CROSS-REFERENCE TO RELATED APPLICATIONS

This application claims the priority under 35 U.S.C. §119 of European patent application no. 10186908.9, filed on Oct. 7, 2010, the contents of which are incorporated by reference herein.

FIELD OF THE INVENTION

This invention relates to dimmer systems and methods of operating dimmer systems.

BACKGROUND OF THE INVENTION

Phase cut dimmers are widely used in a range of applications, including but not limited to lighting applications. A conventional phase-cut dimmer uses a switch to switch off or "cut" part of the mains cycle—or more accurately, half-cycle. Either the leading or trailing edge, or even both edges of the phase can be cut, depending on the type of switch used. Normally either a transistor or a triac is used.

Although this is effective for conventional incandescent lighting, phase cut dimmers can be problematic for more energy efficient types of lighting, such as compact fluorescent lights (CFL), tube lighting (TL), or solid-state lighting (SSL), which are not well suited to cope with the "missing" parts of the mains cycle. Such energy efficient types of lighting are often controlled by means of a switched mode power supply, which switches at frequencies much higher than that of either a 50 Hz or 60 Hz mains cycle—typically several kHz up to several MHz.

For phase cut dimmers to be compatible with such types of lighting, the phase cut power needs to be processed to be usable by the lighting circuit. However, it is important that in such processing, that the information regarding the desired level of dimming, which is included in the phase cut signal, is not lost but is recovered as a dimming control level signal.

Conventionally, a control voltage to indicate the desired level of the dimming is generated by making an integrated signal from the dimmer output signal. This signal will have a level which is proportional to the area under a plot of the dimmer output voltage against time, and is thus a function of not just the dimmer phase angle but also of the mains voltage level. So, fluctuations in mains voltage affect the control level, and thus the apparent dimming setting. Moreover, the integrator needs a time constant the order of seconds for the signal to have minimum ripple, which is not compatible with prompt responsiveness to a user when changing the dimmer level.

An alternative solution has been proposed, for instance in International Patent Application Publication number WO2008/112,735 in which a duty cycle signal is generated from the output of the dimmer. The duty cycle signal, which may take the form of a pulse modulated signal, is indicative of the proportion of the mains cycle during which the switch is on. However, this is not representative of the fraction of the mains power which would be supplied during this proportion of the cycle, due to the sinusoidal nature of both the voltage and current supplied.

Moreover, the response of the human eye to a dimmed light level is generally approximately logarithmic rather than linear, so it be would be preferable if the power supply it to the lighting and could be adjusted so as to be nonlinearly, and ideally logarithmically or nearly logarithmically, related to the phase angle of the dimmer.

It is proposed in WO2008/112,735, to provide such a nonlinear response by post-processing the dimming control level signal using a lookup table. However, such a solution is difficult to implement in a primarily analog circuit, and requires both complex circuitry and significant processing power to implement.

It would therefore be desirable to have a circuit in which the nonlinear response is directly derived from the duty cycle signal.

SUMMARY OF THE INVENTION

It is an object of the present invention to provide a circuit in which a nonlinear response for a dimmer control level signal is directly derived from the duty cycle signal.

According to a first aspect of the invention there is provided a circuit for a dimming system, the circuit comprising: an input for receiving a phase-cut dimmer output signal, the phase-cut dimmer output signal having a period and complementary cut and un-cut parts; an output for outputting a dimming control level signal; a comparator, connected to the input and arranged to produce a pulse-modulated signal from the phase-cut dimmer output signal, the pulse-modulated signal having an on-time which varies in dependence on the duration of the un-cut part; and a converter configured to determine the dimming level control signal directly from the pulse-modulated signal, such that the dimming level control signal has a non-linear relationship with the un-cut part.

In embodiments, the converter is configured to determine the dimming level control signal by means of a variable frequency clock which increments a counter at each clock cycle during the on-time, and to determine the dimming level control signal from the counter. Of course, the skilled person will appreciate that the term "incrementing" should be interpreted in a broadly to mean a step in either direction—depending whether the counter is a count-up or count-down counter, and thus incorporates both positive and negative incrementing, that is to say decrementing.

In embodiments, the clock is arranged to run at an initial rate during an initial part of the period which initial rate is in a fixed relationship with a base rate, and when the counter reaches a predetermined number, to terminate the initial part, set a flag, and reset the counter; the circuit being further configured to set the dimming control level signal to a fully dimmed level if the flag is not set. Thus the transfer function can include a "null" first section, or, in other words, the transfer function can include level shifting. This is particularly useful for applications such as CFL light circuits, where the complete range of dimming cannot be usefully applied, as the lamp tends to become unstable for dimming level greater than about 120° phase angle.

In embodiments, the clock is arranged to run at a first rate over a first part of the period and at a second rate over a second part of the period, wherein the first rate is in a fixed relationship with a base rate and the second rate in a fixed relationship with and higher than the first rate and the second part of the period is later in the period than the first part of the period.

In embodiments, the clock is arranged to run at an initial rate during an initial part of the period which precedes both the first part and the second part in the period, and when the counter reaches a predetermined number, to terminate the initial part, set a flag, and reset the counter; the circuit being further configured to set the dimming control level signal to a fully dimmed level if the flag is not set. Thus the transfer function may include both a null-first section, and sections having different rates.

In embodiments, the circuit is further configured to operate a calibration phase in which at least one of the base rate is adjusted upwards period-by-period, in response to the counter not reaching a second predetermined number during a period or the base rate is adjusted downwards period-by-period in response to the counter exceeding the second predetermined number during the period. Thus, the invention does not require the use of an accurate clock, but the mains frequency can be used to tune the clock, thereby providing a simpler or more cost-efficient solution. In exemplary embodiments, the second predetermined number may be 254 or 255, in particular in the case of an either bit counter. In other embodiments, the circuit is further configured to operate a calibration phase in which at least one of the base rate is adjusted downwards period-by-period in response to the counter reaching a second predetermined number before the end of the period respectively.

According to another aspect of the invention there is provide a controller for a dimmable lighting system comprising a phase-cut dimmer and a circuit as described above.

According to a yet further aspect of the invention, there is provided a method of determining a dimming control level from a phase-cut dimmer output signal having a period and complementary cut and un-cut parts, the method comprising: determining a pulse-modulated signal from the phase-cut dimmer output signal, the pulse-modulated signal having an on-time which varies in dependence on the duration of the un-cut part; and determining the dimming control level signal directly from the pulse modulated signal such that the dimming control level has a non-linear relationship with the cut part.

In embodiments determining the dimming control level signal directly from the pulse modulated signal comprises incrementing a counter of a variable frequency clock at each clock cycle during the on-time, and determining the dimming level control signal from the counter.

In embodiments, the method further comprises running the clock at an initial rate during an initial part of the period which initial rate is in a fixed relationship with a base rate, and when the counter reaches a predetermined number, terminating the initial part, setting a flag, and resetting the counter; and setting the dimming control level signal to a fully dimmed level if the flag is not set.

In embodiments, the method further comprises running the clock at a first rate over a first part of the period and at a second rate over a second part of the period, wherein the first rate is in a fixed relationship with a base rate and the second rate in a fixed relationship with and higher than the first rate and the second part of the period is later in the period than the first part of the period.

In embodiments, the method further comprises running the clock at an initial rate during an initial part of the period which precedes both the first part and the second part in the period, and when the counter reaches a predetermined number, terminating the initial part, setting a flag, and resetting the counter; and setting the dimming control level signal to a fully dimmed level if the flag is not set.

In embodiments, the method further comprises operating a calibration phase in which at least one of the base rate is adjusted upwards period-by-period in response to the counter not reaching a second predetermined number during a period or the base rate is adjusted downwards period-by-period in response to the counter exceeding the second predetermined number during the period. In other embodiments, the method further comprises operating a calibration phase in which the base rate is adjusted downwards period-by-period in response to the counter reaching a second predetermined number before the end of a period.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which FIG. 1 illustrates, at FIG. 1(a), a (leading edge) phase cut curve, and at FIG. 1(b), an equivalent duty cycle curve;

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

Figure 1A:
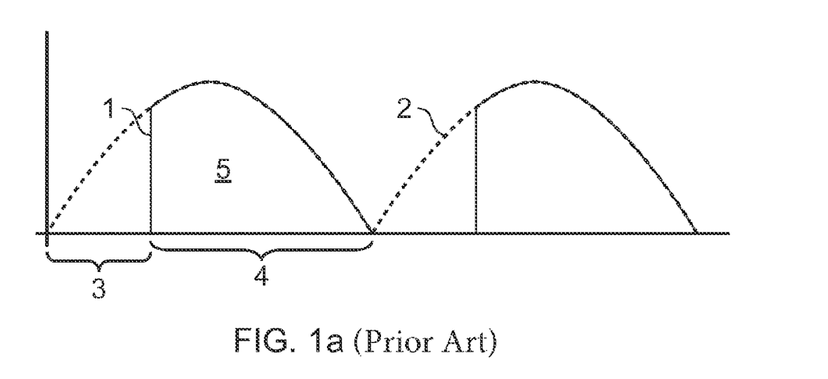

FIG. 1 illustrates, at FIG. 1(a), a (leading edge) phase cut curve 1, such as the output from a conventional phase-cut dimmer. Relative to the complete curve (shown as dashed curve 2), the phase-cut curve only delivers power for a fraction of the mains half-cycle, and thus has a "cut" part 3 and an "un-cut" part 4. The delivered power is, to a first approximation, equal to the area 5 under the un-cut part of the curve.

Figure 1B:
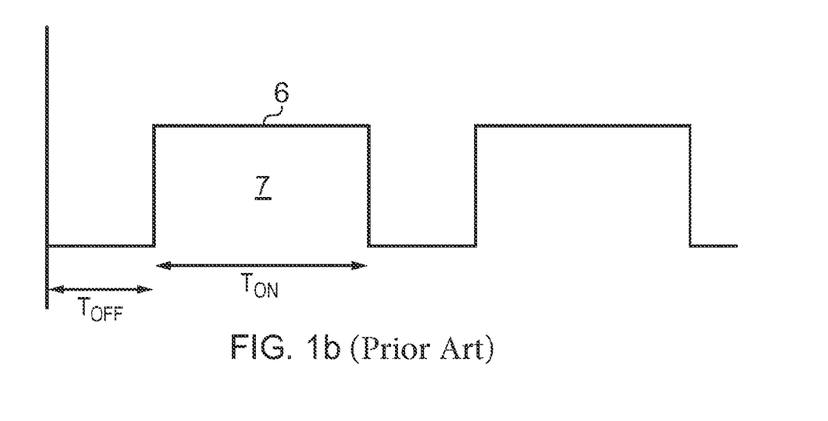

FIG. 1(b) shows a graph of the duty cycle of the curve 1. The duty cycle takes the form of a pulse-modulated signal 6, with an on-time Ton corresponding to the un-cut part of the place, and an off-time Toff corresponding to the cut part of a phase cut curve. The total cycle time of the pulse modulated signal is, plainly, equal to that of (half) of the mains signal. The area 7 under the pulse modulated signal 6 clearly has a linear relationship with Ton.

Figure 2:
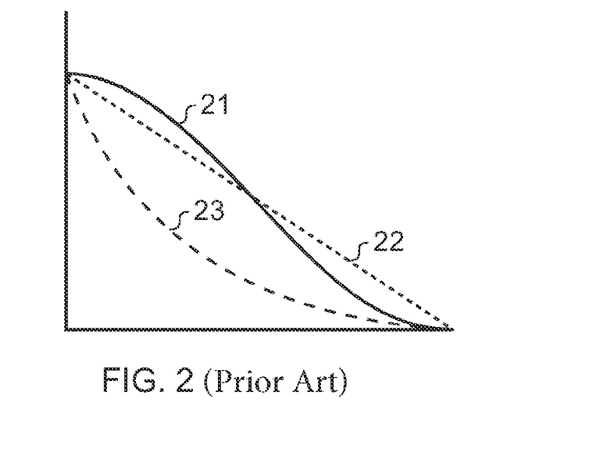
FIG. 2 is a graph showing approximations to the power transferred, according to an integrated signal and a duty cycle signal, along with an ideal transfer function.

FIG. 2 is a graph showing approximations to the power transferred, according to an integrated signal 21, against the cut fraction of the duty cycle. From the sinusoidal nature of the curve 1, the integral of this signal, that is to say, the area 5 under the curve, follows a generally sine-squared (or equivalently, sine(2x)) shape. Also shown in FIG. 2 is straight line 22 which corresponds to the power which would be transferred, according to a pulse-width modulated signal (that is to say, the area 7 under the curve 6).

Figure 3:
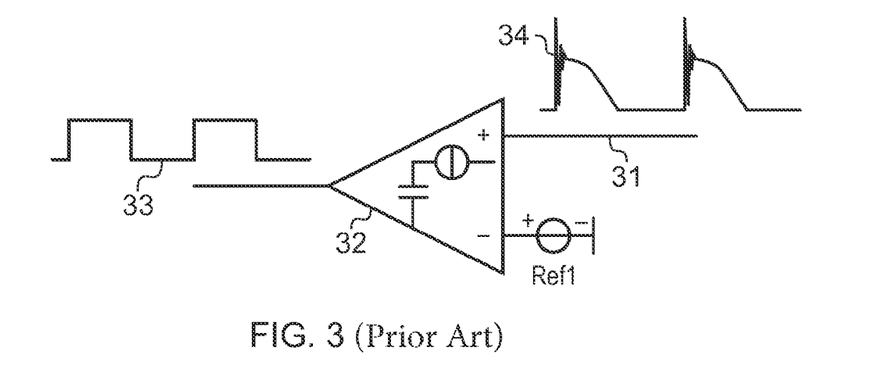
FIG. 3 shows a comparator for generating a duty cycle signal from a phase-cut signal.

Finally, FIG. 2 depicts a logarithmic curve 23. Due to the logarithmic response of the eye, for light dimming applications, this curve corresponds to an "ideal" shape of the power transfer curve. It is clear that neither the integrated signal 21, that is to say the area 5 under the curve 1, nor the duty-cycle response 22, that is to say the area 7 under the pulse modulated signal, provide a good approximation to the ideal curve 23. This will be considered further hereinbelow FIG. 3 shows a comparator for generating a duty cycle signal from a phase-cut signal. The output signal of the phase cut dimmer is scaled by a resistive divider (not shown), and provided as a first input 31 to comparator 32. A reference level Ref1 which is close to zero is provided as the other input to the comparator. The comparator output corresponds to a signal of the mains frequency with a duty cycle proportional to the dimmer phase un-cut signal. It will be appreciated that the input may have some noise jitter around the cutting position, that is to say the time at which the switch switches the dimmer on (for a leading edge phase cut) or off (for a trading edge phase cut). Some blanking or filtering may thus be necessary, as will be familiar to those skilled in the art and thus is not shown in order not to obscure the figure, on the comparator in order to ensure a clean duty cycle signal as shown in FIG. 3.

The duty cycle, that is to say Ton/(Toff+Ton), of the signal 33 may be determined either by analog means or digital means. If an accurate clock with known frequency is available, the length of the on-time may simply be measured by counting clock cycles. Even if an accurate clock is not available, provided the period of the duty cycle—which will correspond typically to either 50 Hz or 60 Hz—is known, then the clock may be calibrated by counting the number of clock cycles more the complete period, and then the duty cycle determined by counting the on-time of the pulse modulated signal. Even if it is not known which of 50 Hz or 60 Hz is being used, it may still be possible to determine the on time, (for instance, it may be possible to deduce that either the lower, or higher, of the two frequencies is being used).

Figure 4:
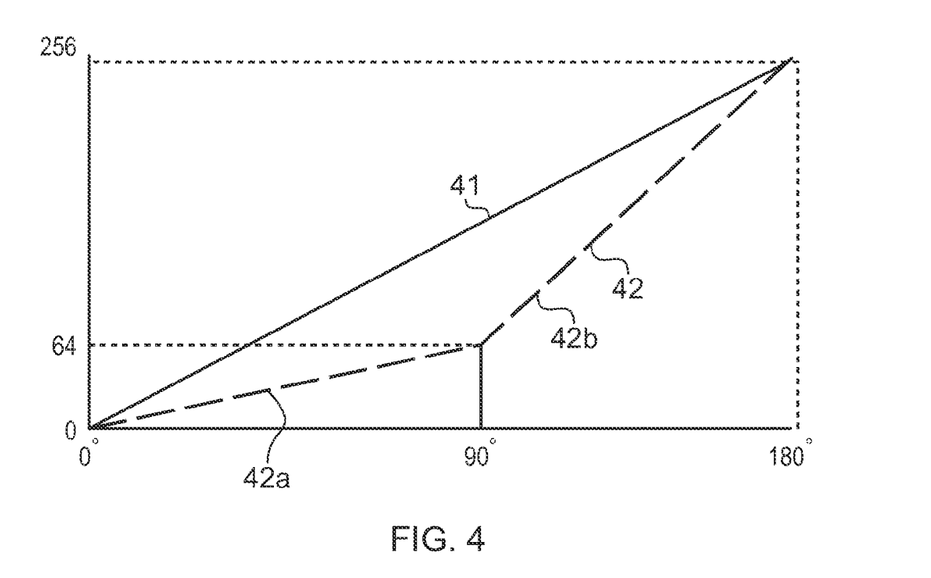
FIG. 4 shows a non-linear, piecewise linear, transfer function.

Turning to FIG. 4, the straight line 41 shows a transfer function between clock counts (which provides a dimmer level control signal) and the on-time of the pulse modulated signal using a clock or counter with a constant frequency. The clock is either an accurate clock which achieves 256 counts over a 180° phase, or may be an inaccurate clock which has been suitably calibrated or tuned as will be further discussed below.

As will be clear from the discussion with regard to FIG. 3, the response 41 is not ideal. A piece-wise linear response as shown at 42, according to embodiments of the invention, is preferred. In order to achieve this, the concept of a variable frequency clock may be applied: 42 has two sections: a first section 42a with a first gradient, corresponding to the first half of the phase from 0° to 90°; and a second section 42b corresponding to the second half of a phase, from 90° to 180°. In the exemplary case shown in figure, the gradient of the second section 42b is three times that of the first section 42a, such that the clock count at 90° is 64 in order to achieve a clock count of 256 at 180°

Figure 5:
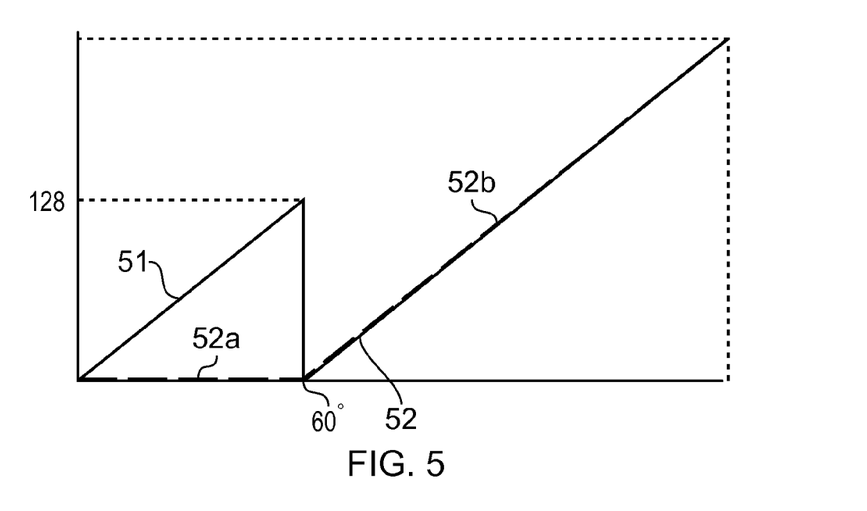
FIG. 5 shows a transfer function, with an initial null-transfer part or level shifting.

Of course for an example mains frequency of 50 Hz, the half-cycle lasts 10 ms, so the 90° phase corresponds to 5 ms. In order to achieve this response, the clock has to achieve a count of 64 in the first 5 ms, and a further 192 in the final 5 ms. Thus the clock must be set to run faster in the second section than the first section—by a factor of three in the example shown. Example configurations of such a clock will be discussed further hereinbelow The transfer function shown in FIG. 5 is another approximation to the ideal logarithmic response. FIG. 5 shows a transfer function 52, with an initial null-transfer part or level shifting. Again, the curve has two sections: a first section 52a, and a second section 52b. In contrast to the method shown in FIG. 4, in this case the clock runs at a constant rate. The clock starts counting at the start of the period, as shown by curve 51. When the clock reaches a predetermined count, shown as 128 in the exemplary figure and corresponding to a phase of say 60°, the clock is reset, and the count restarts from zero, as shown at curve 52b. In order to ensure that transfer function follows the desired curve 52, such that the output is zero provided that the on-time is less than the exemplary 60° (or 3.33 ms for a 50 Hz mains), rather than section 51 followed by section 52b, a flag is used which is unset at the start of the period, and then set when the clock is reset. The flag may take the form of a latch.

In operation, then, counting starts at the rising edge of the pulse modulated signal and stops at the falling edge. If the flag is unset, corresponding to an unlatched output, the output is set to 0; correspondingly, a "set" flag indicates that the response is part of the second part of the curve, and the output is set to the value of the count at the falling edge.

Figure 6:
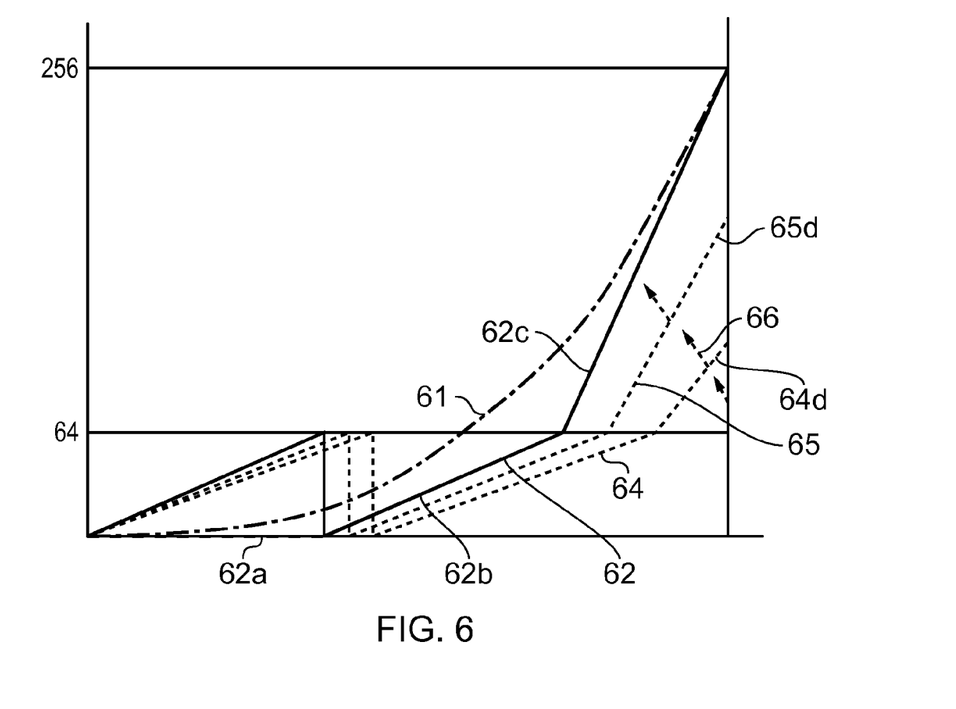
FIG. 6 shows a further non-linear, piecewise linear, transfer function.

FIG. 6 shows a further non-linear, piecewise linear, transfer function. This transfer function 62 provides a closer approximation to an idealized logarithmic output 61 than either of those described above with reference to FIGS. 4 and 5. It has three sections, 62a, 62b and 62c, and is a combination of those shown in FIG. 4 and FIG. 5: thus, initially, to produce section 62a of the transfer function, the clock runs at a first speed up to a count of 64, at which moment the flag is set and the counter is reset to zero. The counter then recounts up to a count of 64—producing the second section 62b of the transfer function. Once the counter reaches 64, the clock speed is increased (in this case by a factor of three) until the end of the period, producing the third section 62c which has a steeper gradient.

Thus, according to embodiments of the invention, by using a variable frequency clock, it is possible to generate a piecewise transfer function and thus a linear dimming control level signal directly from the duty-cycle signal. This considerably simplifies the circuit requirements, and avoids the need for digital processing such as, for example, a look-up table, with its associated additional circuitry and power consumption.

As already mentioned, it is not a requirement of embodiments of the invention to have an accurate clock. Rather, of the clock can be tuned or calibrated by using the pulse modulated signal itself. This is illustrated schematically in FIG. 4, by curves 64 and 65. 64 shows a transfer function prior to tuning calibration of the clock frequency. The shape of the component is generally the same as 62 described above; however, in this case the clock is running slowly. The end of the mains half-cycle corresponds to the next subsequent falling edge of the pulse modulated signal in the case that the counting is started at a first falling edge at the beginning of the mains half-cycle for a leading-edge cut dimmer. (Of course the skilled person will appreciate that during this calibration phase the counting may be started at either a rising or falling edge, since only the complete period is of interest). At this end of the mains half-cycle, the count has not reached the expected maximum of 256 but only a lower count (shown as 64d in the figure), from which it can be concluded that the clock is running too slow. The clock speed is then increased by a small step as will be discussed in more detail below, and the value 65d of the count 65 at the end of the next subsequent period is checked. This is repeated period-by-period until the count at the end of a period has reached the required number (256 in this non-limiting 8-bit example). It is of course necessary to ensure that the clock is running too slow at the start of this calibration phase, which can be readily achieved by choosing to appropriate clock speed.

Figure 7:
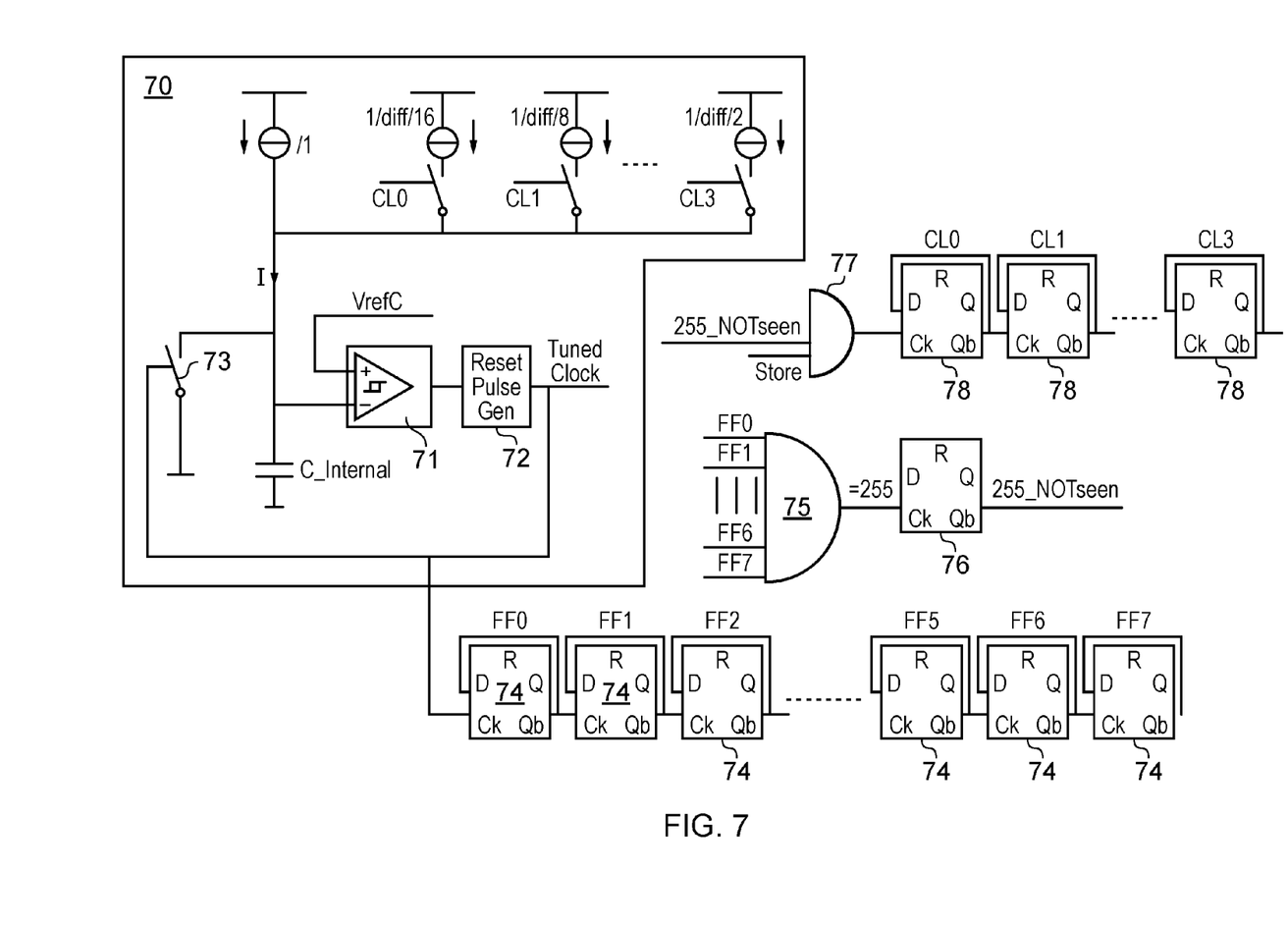
FIG. 7 is a schematic block circuit diagram of a circuit arrangement for tuning a clock signal.

FIG. 7 is a schematic block circuit diagram of a circuit arrangement for tuning a clock signal, according to embodiments of the invention is described.

FIG. 7 shows a clock, 70, which comprises a comparator which compares the voltage across the internal capacitor C_internal with a reference voltage VrefC. The capacitor is charged by a current I, until its voltage exceeds VrefC. The comparator 71, which may include some hysteresis as shown, then provides a clock pulse though reset pulse generator 72 which also closes switch 73 to discharge the capacitor C_internal. The clock speed is thus proportional to the charging current I. charging current I is produced by a combination of a first current generator providing current I1, and a series of binary-scaled current generators providing I_diff/16, 1_diff/8, etc., which are separately switchable by means of switches CL0, CL1 etc. Thus, the total current driving the clock can be varied by small steps of I_diff/16, from I1 up to I1+15.I_diff/16.

As shown, the clock output is connected to a series of flip-flops FF0, FF1 . . . FF7, arranged as an 8-bit register and thus able to store any value from 0 to 255. The outputs from the 8-bit register are combined by AND logic 75 the output from the logic 75 is inverted by inverter 76. The output from the invertor (255_NOTseen) is combined with AND logic 77, and routed to a linked series of flip-flops 78 which forms a 4-bit register. Sequentially pulse to the 4-bit register result in closing the switches CL0, C1 etc. sequentially, until the counter achieves 255 in a mains half-cycle. Of course, a different number may be used instead of the number 255 described above. For instance, for a nine-bit counter, 512 could be used. Furthermore, it is not necessary that the highest number obtainable by the register, which can also be considered a counter, be used. For instance, 254—which is 1 less than the maximum obtainable from an 8-bit counter—may by used, or 250 or some other convenient number. The case of 254 is particularly convenient for another calibration method, which may be used as an alternative to or in combination with that described above. In this calibration method, the base rate is initially set high, and it is checked whether the counter has reached the desired calibration value too early. This may be done, as the skilled person will appreciate, in various ways, for example—in the case that the counter can exceed the required level—it may be checked whether at the end of the period the counter exceeds the required level such as 254 or 250 mentioned above, or it can be arranged that a flag is set once the required level is achieved, and it is checked whether this flag is set prior to the end of the period, or more specifically, prior by at least a fixed interval before the end of the period.

The calibration phase is now complete and duty cycle counting can be activated.

Figure 8:
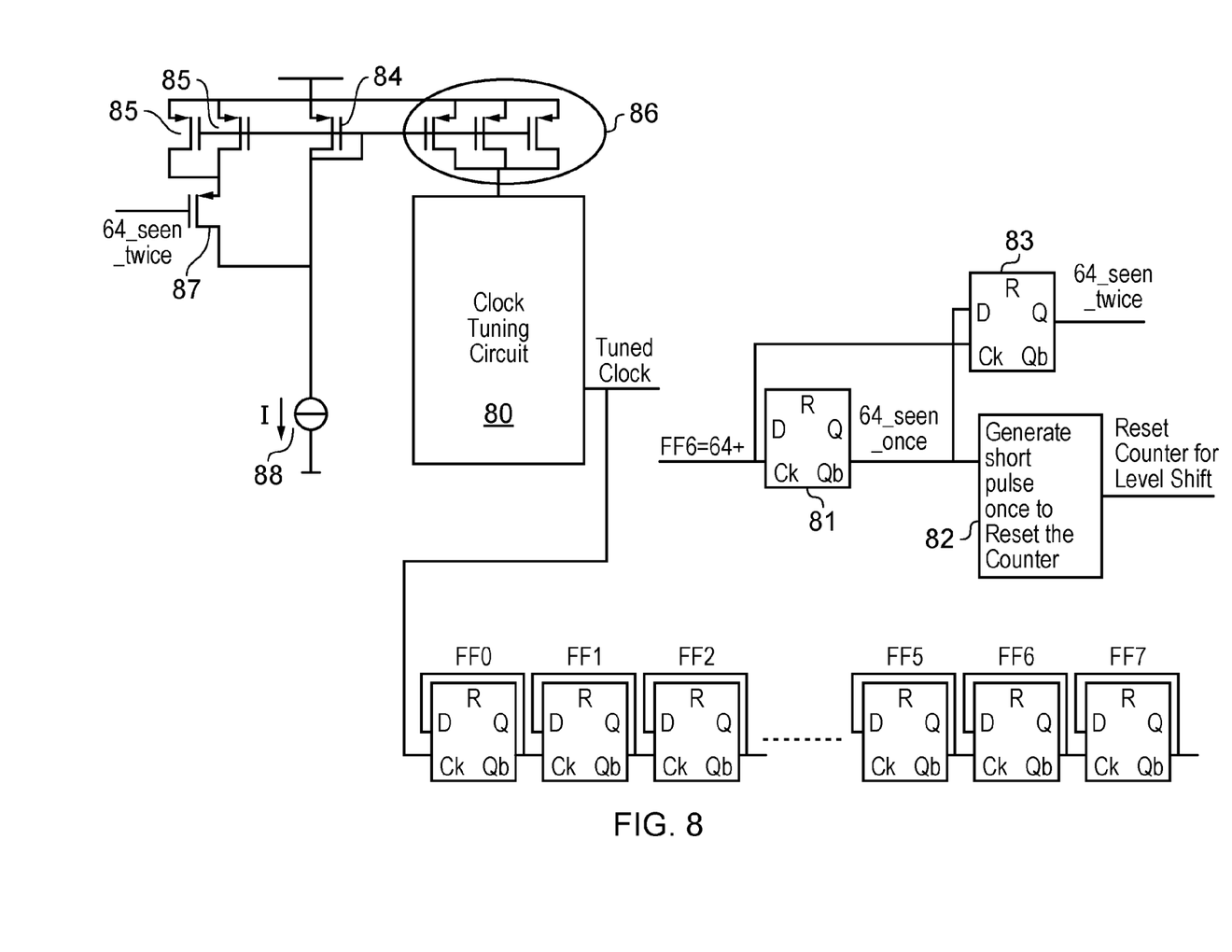
FIG. 8 is a schematic block circuit diagram of a circuit having a non-linear, piece-wise linear with level shifting, transfer function.

FIG. 8 is a schematic block circuit diagram of a circuit having an overall non-linear, but piece-wise linear with level shifting, transfer function. The circuit includes a clock tuning circuit 80 corresponding to that shown in FIG. 7 along with and 8-bit register FF0, FF1 . . . FF7 for counting. An alternative current source including a parallel group 86 of three transistors is shown. Each transistor of 86 is a current mirror which mirrors the current through MOS 84. During a first part of the calibration curve, MOS 84 is arranged in parallel to a pair of similar transistors 85, which may be switched by means of switch 86, and all three are in series with current source 85 sourcing current I. During a first part of a period, the switch 86 is closed, so the current from current source 85 is shared equally between MOS 84 and the 2 other transistors. The current through MOS 84 is then 1/3.I as a result of which each transistor in group 86 supplies 1/3.I to the clock tuning circuit—hence the total supplied to clock tuning circuit 80 is I. However, during the later part of the calibration curve (once the counter has reached 64 twice), the switch 87 is opened, so the complete current I flows through MOS 84. This is mirrored in each transistor of 84, resulting in a current of 3×I being supplied to the clock tuning circuit 80. Of course, it will be appreciated that the current I shown in FIG. 8 may be adjusted, as described above with reference to FIG. 7 and not shown in FIG. 8, by means of trimming or adjustment current sources providing additional quantu I_diff/16, to a base current I1. That is to say, (I=I1+N/16×I_diff), as previously described, where the trimming has introduced N quanta of I_diff/16.

The skilled person will appreciate that adjusting the current by this means will require modifying the arrangement of FIG. 7, wherein the trimming current sources are located at the high side of the circuit, to one where they are at the low side with current source 88. An alternative approach in which the additional current sources are at the high side is also possible, as will now be described with the following definitions: 'slope factor', which is either 1 or 3, depending on switch 87; I1_unity is the value of I1 required to make base clock current for counting with unity speed; and I_diff_unity is the value of I_diff required to accurately trim the clock current for counting with unity speed. Then, it is required to take a fixed current I, multiply it by the (getting I_86), and then generate the I1 and I_diff currents proportional to the resulting current (I_86). However, in this case, the equation $$(I=I1+N/16\times I\_diff)$$

is no longer valid, and it would be necessary to choose separate proportionality constants A and B, such that:

$$I\_1=A*I\_86 \text{ and } I\_diff=B*I\_86.$$

Additional logic checks the output of FF6 (which indicates whether a count of 64 has been reached and, by means of flip-flop 81, if 64 has been reached for the first time (in the period), in which case it generates at 82 a short pulse to reset the counter. When the flip-flop 81 is triggered a second time, a signal is generated by a second latching flip-flop 83, to switch on, by means of switch 84, the current I3, in order to increase the clock speed, and thus change the gradient of the transfer function, as discussed above with reference to FIG. 6.

The logic described with reference to FIG. 8 is suitable for providing the transfer function shown in FIG. 6 with a stepwise linear having three parts; however, the invention is not limited to this specific transfer function, and the skilled person will readily appreciate that alternative logic may be used to provide alternative stepwise linear functions, which may, for instance and without limitation, have four parts or have different ratios between the counting speeds.

It will be appreciated that the term piece-wise linear when applied to a transfer function, refers to the transfer function as a whole, and refers to transfer functions which have linear sections, but are, overall, non-linear. That is to say, they are only linear to the extent that pieces of the function are linear, and not the whole function.

From one viewpoint, then, there is disclosed herein a circuit for a dimmer system, in which a phase-cut dimmer output signal is converted to a dimming control level signal. The phase-cut dimmer output signal is used to generated a pulse modulated signal indicative of the duty cycle of the phase cut dimmer output signal, and the pulse modulated signal is directly converted to a piece-wise linear dimming control level signal. By directly converting the pulse modulated signal to a piece-wise linear dimming control level signal, no further processing is necessary to produce a dimming signal which closely resembles the ideal logarithmic response of the human eye. A corresponding method for a dimmer system is also disclosed, as is a dimmer system.

From reading the present disclosure, other variations and modifications will be apparent to the skilled person. Such variations and modifications may involve equivalent and other features which are already known in the art of dimmer circuits, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A circuit for a dimming system, the circuit comprising:
   an input for receiving a phase-cut dimmer output signal, the phase-cut dimmer output signal having a period and complementary cut and un-cut parts;
   an output for outputting a dimming control level signal;
   a comparator, connected to the input and arranged to produce a pulse-modulated signal from the phase-cut dimmer output signal, the pulse-modulated signal having an on-time which varies in dependence on the duration of the un-cut part; and
   a converter configured to determine the dimming level control signal directly from the pulse-modulated signal, such that the dimming level control signal has a nonlinear but piece-wise linear relationship with the un-cut part; and
   wherein the converter is configured to determine the dimming level control signal by means of a variable frequency clock which increments or decrements a counter at each clock cycle during the on-time, and to determine the dimming level control signal from the counter.

2. A circuit according to claim 1, wherein the clock is arranged to run at an initial rate during an initial part of the period which initial rate is in a fixed relationship with a base rate, and when the counter reaches a predetermined number, to terminate the initial part, set a flag, and reset the counter; the circuit being further configured to set the dimming control level signal to a fully dimmed level if the flag is not set.

3. A circuit according to claim 1, wherein the clock is arranged to run at a first rate over a first part of the period and at a second rate over a second part of the period, wherein the first rate is in a fixed relationship with a base rate and the second rate in a fixed relationship with and higher than the first rate and the second part of the period is later in the period than the first part of the period.

4. A circuit according to claim 2, wherein the clock is arranged to run at an initial rate during an initial part of the period which precedes both the first part and the second part in the period, and when the counter reaches a predetermined number, to terminate the initial part, set a flag, and reset the counter; the circuit being further configured to set the dimming control level signal to a fully dimmed level if the flag is not set.

5. A circuit according to claim 2, further configured to operate a calibration phase in which the base rate is adjusted upwards period-by-period in response to the counter not reaching a second predetermined number during a period or the base rate is adjusted downwards period-by-period in response to the counter exceeding the second predetermined number during the period respectively.

6. A circuit according to claim 2, further configured to operate a calibration phase in which the base rate is adjusted downwards period-by-period in response to the counter reaching a second predetermined number before the end of a period.

7. A controller for a dimmable lighting system comprising a phase-cut dimmer and a circuit as claimed in claim 1.

8. A method of determining a dimming control level from a phase-cut dimmer output signal having a period and complementary cut and un-cut parts, the method comprising
   determining a pulse-modulated signal from the phase-cut dimmer output signal, the pulse-modulated signal having an on-time which varies in dependence on the duration of the un-cut part; and
   determining the dimming control level signal directly from the pulse modulated signal such that the dimming control level has a nonlinear piece-wise linear relationship with the cut part; and
   wherein determining the dimming control level signal directly from the pulse modulated signal comprises
      incrementing a counter of a variable frequency clock at each clock cycle during the on-time, and
      determining the dimming level control signal from the counter.

9. The method of claim 8, further comprising running the clock at an initial rate during an initial part of the period which initial rate is in a fixed relationship with a base rate,
   and when the counter reaches a predetermined number, terminating the initial part, setting a flag, and resetting the counter;
   and setting the dimming control level signal to a fully dimmed level if the flag is not set.

10. The method of claim 9, further comprising running the clock at a first rate over a first part of the period and at a second rate over a second part of the period, wherein the first rate is in a fixed relationship with a base rate and the second rate in a fixed relationship with and higher than the first rate and the second part of the period is later in the period than the first part of the period.

11. The method of claim 10, further comprising running the clock at an initial rate during an initial part of the period which precedes both the first part and the second part in the period,
   and when the counter reaches a predetermined number, terminating the initial part, setting a flag, and resetting the counter;
   and setting the dimming control level signal to a fully dimmed level if the flag is not set.

12. The method of any of claim 8, further comprising operating a calibration phase in which the base rate is adjusted upwards period-by-period, in response to the counter not reaching a second predetermined number during a period or the base rate is adjusted downwards period-by-period in response to the counter exceeding the second predetermined number during the period respectively.

13. The method of claim 8, further configured to operate a calibration phase in which the base rate is adjusted downwards period-by-period in response to the counter reaching a second predetermined number before the end of a period.

* * * * *